US012001556B2

(12) United States Patent
Hung et al.

(10) Patent No.: US 12,001,556 B2
(45) Date of Patent: *Jun. 4, 2024

(54) ANTI-VIRUS CHIP AND ANTI-VIRUS METHOD

(71) Applicant: Nuvoton Technology Corporation, Hsinchu Science Park (TW)

(72) Inventors: Ming-Che Hung, Xinpu Township, Hsinchu County (TW); Chia-Ching Lu, Hsinchu (TW); Shih-Hsuan Yen, Zhubei (TW); Chih-Wei Tsai, Zhubei (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,528

(22) Filed: Apr. 18, 2023

(65) Prior Publication Data
US 2023/0252151 A1 Aug. 10, 2023

Related U.S. Application Data

(63) Continuation of application No. 17/190,989, filed on Mar. 3, 2021, now Pat. No. 11,663,335.

(30) Foreign Application Priority Data

Apr. 24, 2020 (TW) .................................. 109113721

(51) Int. Cl.
*G06F 21/56* (2013.01)
*G06F 21/00* (2013.01)

(52) U.S. Cl.
CPC .......... *G06F 21/567* (2013.01); *G06F 21/566* (2013.01)

(58) Field of Classification Search
CPC ...... G06F 21/567; G06F 21/566; G06F 21/56; G06F 21/561; G06F 21/562; G06F 21/563; G06F 21/564; G06F 21/50; G06F 21/577

See application file for complete search history.

(56) References Cited

U.S. PATENT DOCUMENTS

2010/0241875 A1 9/2010 Ishii et al.
2013/0291112 A1* 10/2013 Shue .................... G06F 21/562
726/24

(Continued)

FOREIGN PATENT DOCUMENTS

CN 102023933 A 4/2011
CN 109145599 A 1/2019

(Continued)

OTHER PUBLICATIONS

An Office Action and a Search Report in corresponding CN Application No. 202110238532.9 dated Apr. 29, 2023 is attached, 14 and 4 pages respectively.

*Primary Examiner* — Edward Zee
(74) *Attorney, Agent, or Firm* — Muncy, Geissler, Olds & Lowe, P.C.

(57) ABSTRACT

An anti-virus chip includes a first connection terminal, a second connection terminal, a detection unit and a processing unit. The first connection terminal and the second connection terminal are respectively coupled to a connection port and a system circuit of an electronic device. The detection unit detects whether the connection port is connected to an external device via the first connection terminal. When the detection unit detects that the connection port is connected to the external device, the processing unit performs a virus-scan program on the external device to determine whether a virus exists in the external device. When determining that a virus does not exist in the external device, (Continued)

the processing unit establishes a first transmission path between the first connection terminal and the second connection terminal. When determining that a virus exists in the external device, the processing unit does not establish the first transmission path.

16 Claims, 6 Drawing Sheets

(56) References Cited

U.S. PATENT DOCUMENTS

| | | |
|---|---|---|
| 2014/0007239 A1 | 1/2014 | Sharpe et al. |
| 2015/0058587 A1 | 2/2015 | Wang et al. |
| 2016/0373408 A1 | 12/2016 | Wentworth et al. |

FOREIGN PATENT DOCUMENTS

| | | |
|---|---|---|
| CN | 110050264 A | 7/2019 |
| CN | 110688657 A | 1/2020 |
| CN | 110704843 A | 1/2020 |
| JP | 6643128 B2 | 2/2020 |
| TW | 201040785 A1 | 11/2010 |
| TW | 201131482 A1 | 9/2011 |
| TW | 201411392 A | 3/2014 |

\* cited by examiner

ANTI-VIRUS CHIP AND ANTI-VIRUS METHOD

CROSS REFERENCE TO RELATED APPLICATIONS

This application is a Continuation of U.S. patent application Ser. No. 17/190,989, filed Mar. 3, 2021, which claims priority of Taiwan Patent Application No. 109113721, filed on Apr. 24, 2020, the entirety of which is incorporated by reference herein.

BACKGROUND OF THE INVENTION

Field of the Invention

The present invention relates to an anti-virus technology, and in particular it relates to an anti-virus chip and an anti-virus method.

Description of the Related Art

In general, when an external device, such as a flash drive, is connected to a connection port of an electronic device, the operating system of the electronic device may connect automatically to the external device and read all files of the external device. However, if a virus exists in the external device, the virus may easily spread to (infect) all the data by following the file system of the electronic device.

In addition, since a boot sector of the electronic device is infected by the virus after the electronic device is connected to the external device, an anti-virus software running on the operating system may only notify the user and may not eliminate this boot-type virus. Therefore, general anti-virus software may not prevent an attack by a boot-type virus.

BRIEF SUMMARY OF THE INVENTION

An embodiment of the present invention provides an anti-virus chip. The anti-virus chip includes a first connection terminal, a second connection terminal, a detection unit and a processing unit. The first connection terminal is coupled to a connection port of an electronic device. The second connection terminal is coupled to a system circuit of the electronic device. The detection unit detects whether the connection port is connected to an external device via the first connection terminal. When the detection unit detects that the connection port is connected to the external device, the processing unit performs a virus-scan program on the external device to determine whether a virus exists in the external device. When determining that a virus does not exist in the external device, the processing unit establishes a first transmission path between the first connection terminal and the second connection terminal. When determining that a virus exists in the external device, the processing unit does not establish a first transmission path.

An embodiment of the present invention provides an anti-virus method suitable for an anti-virus chip. The anti-virus chip is coupled between a connection port of an electronic device and a system circuit of the electronic device. The anti-virus method includes: detecting whether the connection port is connected to an external device; performing a virus-scan program on the external device to determine whether a virus exists in the external device when detecting that the connection port is connected to the external device; establishing a first transmission path between the connection port and the system circuit when determining that a virus does not exist in the external device; and not establishing a first transmission path when determining that a virus exists in the external device.

An embodiment of the present invention provides an anti-virus chip. The anti-virus chip includes a first connection terminal, a second connection terminal, a random access memory and a processing unit. The first connection terminal is coupled to a connection port of an electronic device. The second connection terminal is coupled to a system circuit of the electronic device. The processing unit performs a write-test program on the random access memory according to internal data output by the system circuit, and the processing unit determines whether a virus exists in the system circuit according to the test result of the write-test program. When determining that a virus exists in the system circuit, the processing unit does not establish a first transmission path between the first connection terminal and the second connection terminal. When the virus does not exist in the system circuit, the processing unit establishes a first transmission path.

BRIEF DESCRIPTION OF THE DRAWINGS

The present invention can be more fully understood by reading the subsequent detailed description and examples with references made to the accompanying drawings, wherein.

and

Figure 5:
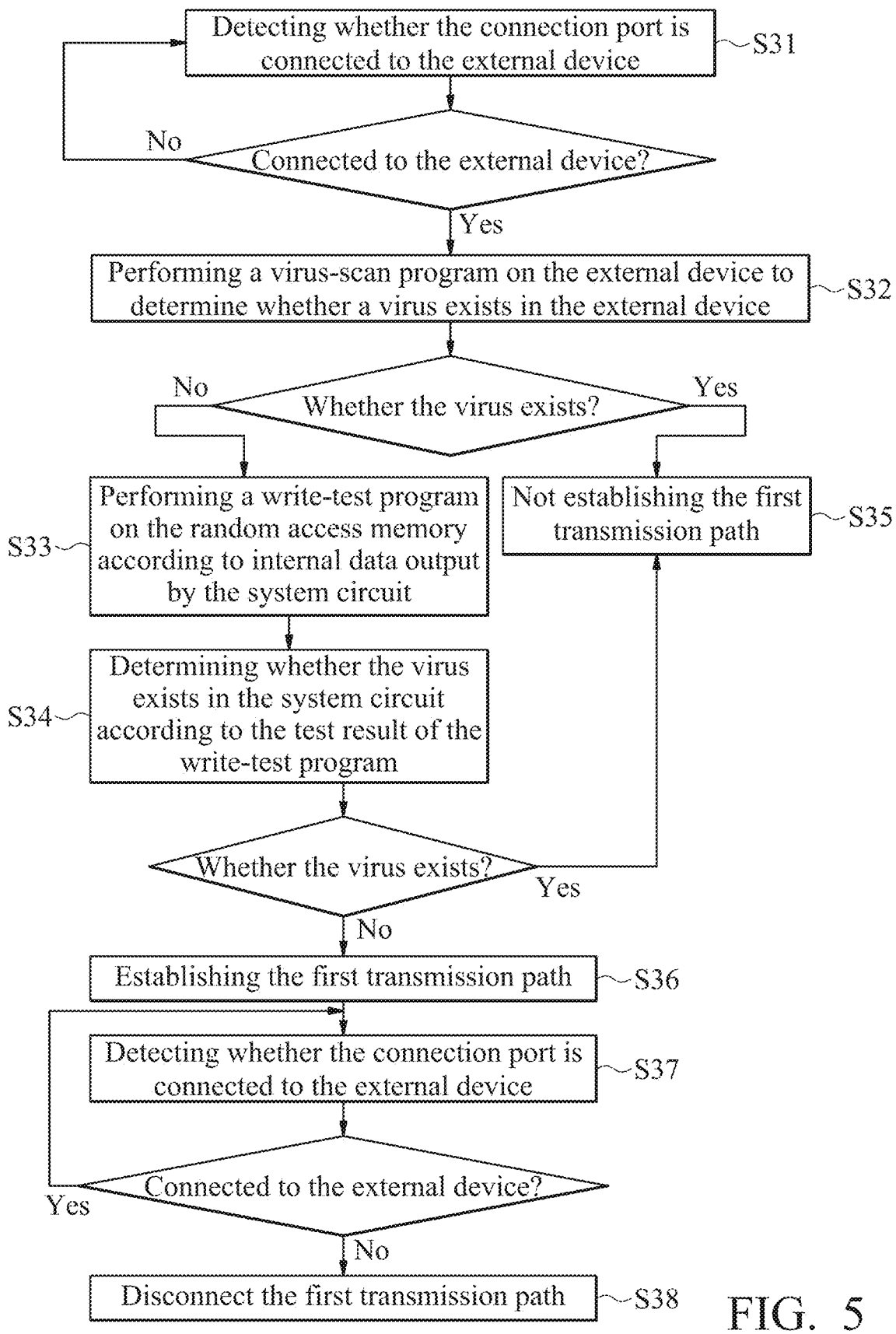

FIG. 5 is a schematic flowchart of a fourth embodiment of an anti-virus method.

DETAILED DESCRIPTION OF THE INVENTION

In order to make the above objects, features and advantages of the embodiments of the present invention easier to understand, a detailed description is given in the following embodiments with reference to the accompanying drawings.

It should be understood that terms "include" or "comprise" used in this specification is used to indicate the existence of specific technical features, values, method steps, operations, elements and/or components, but it is not excluded that more technical features, values, method step, operations, elements, components, or any combination of th above may be added.

Terms, such as "first", "second", and "third", are used to modify elements, and not used to indicate priority or antecedent relationship between them, but only to distinguish elements with the same name.

Figure 1:
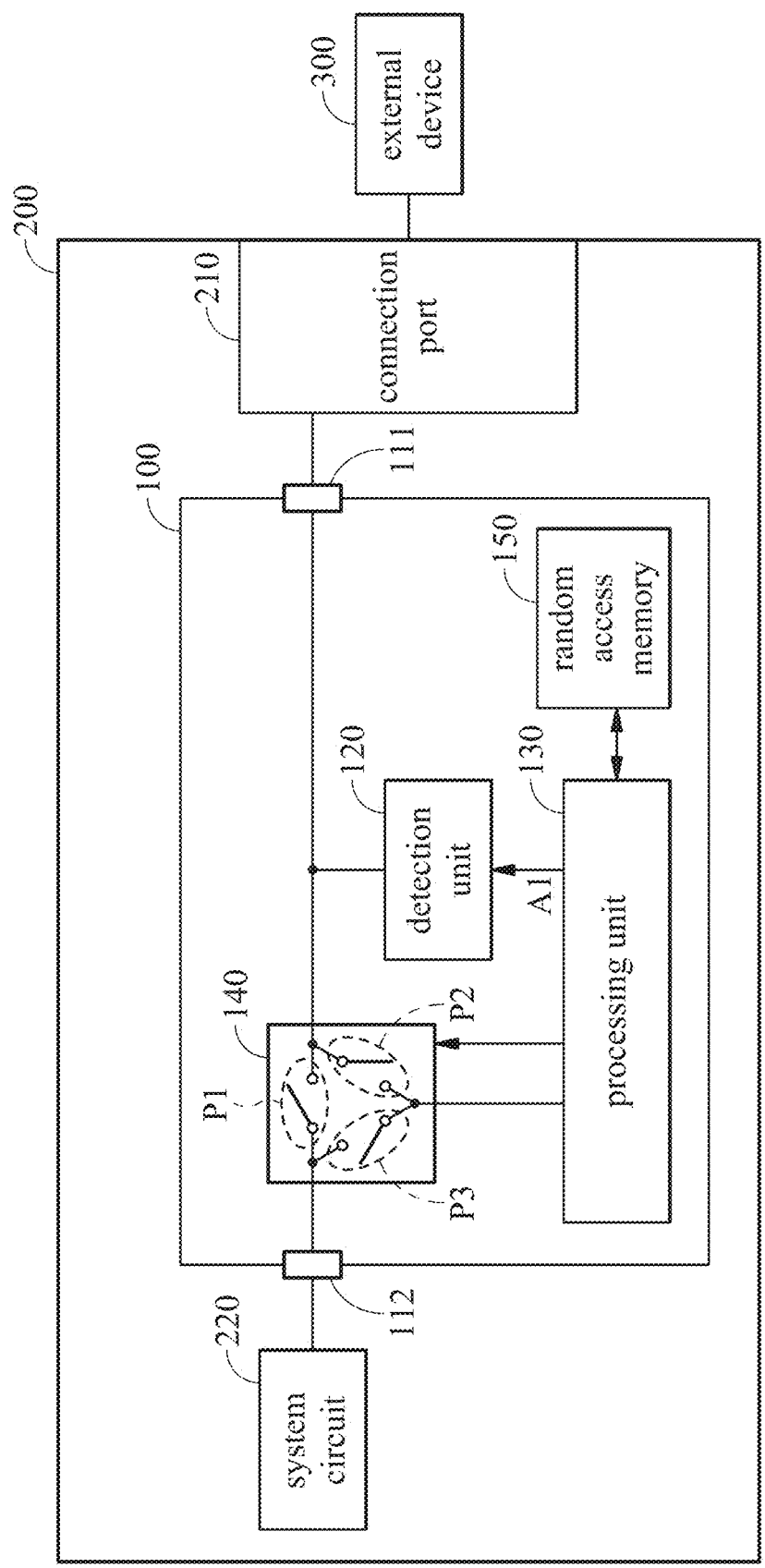
FIG. 1 is a schematic view of an embodiment of an external device connected to an electronic device with an anti-virus chip.

FIG. 1 is a schematic view of an embodiment of an external device connected to an electronic device with an anti-virus chip. Please refer to FIG. 1. The anti-virus chip 100 may be disposed inside the electronic device 200. The electronic device 200 includes a connection port 210 and a system circuit 220. The connection port 210 may be used to connect to the external device 300, and the anti-virus chip 100 is located between the connection port 210 and the system circuit 220, so as to control whether a transmission path between the connection port 210 and the system circuit 220 is established. In the embodiment, when the external device 300 is connected to the connection port 210 of the electronic device 200, for example, the user inserts a connection port 310 of the external device 300 into the connection port 210 of the electronic device 200 or connects the external device 300 to the connection port 210 of the electronic device 200 through a connection line, the system circuit 220 of the electronic device 200 may not directly establish a transmission with the external device 300 at this time. Then, the system circuit 220 needs to communicate with the external device 300 via the connection of the anti-virus chip 100 after the anti-virus chip 100 determines that a virus does not exist.

In an embodiment, the anti-virus chip 100 may perform an anti-virus method of a first embodiment of the present invention, so that the anti-virus chip 100 may connect the external device 300 to the system circuit 220 after determining that the virus does not exist in the external device 300, so as to prevent the electronic device 200 from being attacked by the virus. In another embodiment, the anti-virus chip 100 may also perform an anti-virus method of a second embodiment or a third embodiment of the present invention, so that the an anti-virus chip 100 may connect the external device 300 to the system circuit 220 after determining that the virus does not exist in the system circuit 220, so as to prevent the external device 300 from being attacked by the virus. In yet another embodiment, the anti-virus chip 100 may further perform an anti-virus method of a fourth embodiment of the present invention, so that the anti-virus chip 100 may connect the external device 300 to the system circuit 220 after determining that the virus does not exist in the external device 300 and the virus does not exist in the system circuit 220, so as to prevent any party from being attacked by the virus.

In some embodiments, the electronic device 200 may be various electronic devices, such as a computer, a notebook, a tablet, a mobile phone, a machine, etc. In addition, the transmission interface used by the connection port 210 may be a universal series bus (USB), a series advanced technology attachment (SATA), a parallel advanced technology attachment (PATA), a peripheral controller interface (PCI) or other suitable transmission interfaces. In the embodiment, the connection port 210 is described by using the universal series bus as an example.

In some embodiments, the system circuit 220 may be a core circuit of the electronic device 200, such as a chipset. The chipset may be, for example, a north bridge chip, a south bridge chip, a combination of the north bridge chip and the south bridge chip, an independent chip, etc. The external device 300 may also be various electronic devices suitable for transmission with the electronic device 200, such as a flash drive, an external hard drive, a mobile phone, etc. Furthermore, the anti-virus chip 100 and the system circuit 220 may be disposed on the same circuit board, but the present invention is not limited thereto.

Figure 2:
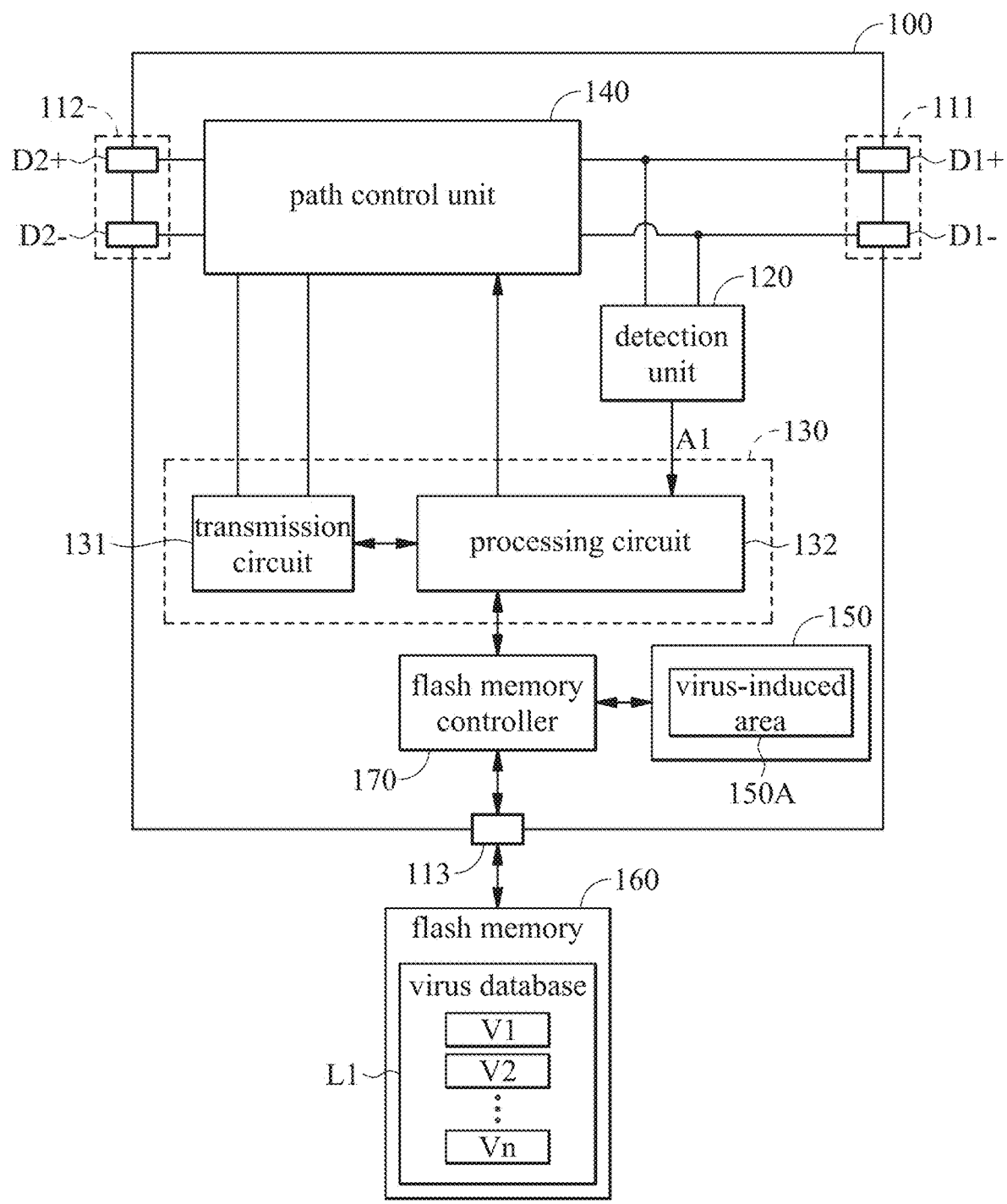
FIG. 2 is a block diagram of an embodiment of an anti-virus chip.

FIG. 2 is a block diagram of an embodiment of an anti-virus chip. Please refer to FIG. 1 and FIG. 2. In an embodiment, the anti-virus chip 100 may include at least two connection terminals (hereinafter referred to as a first connection port 111 and a second connection terminal 112), a detection unit 120 and a processing unit 130. In addition, the anti-virus chip 100 may further include a path control unit 140. The detection unit 120 is coupled to the first connection terminal 111, the path control unit 140 is coupled to the first connection terminal 111 and the second connection terminal 112, and the processing unit 130 is coupled to the detection unit 120 and the path control unit 140.

The first connection terminal 111 is used to couple to the connection port 210 of the electronic device 200, and the second connection terminal 112 is used to couple to the system circuit 220 of the electronic device 200. In some embodiments, when the connection port 210 is the universal series bus transmission interface, the first connection terminal 111 may include at least two data pins (hereinafter referred to as a first positive phase data pin D1+ and a first negative phase data pin D1−), and the second connection terminal 112 may also include at least two data pins (hereinafter referred to as a second positive phase data pin D2+ and a second negative phase data pin D2−).

The detection unit 120 is coupled to the first positive phase data pin D1+ and the first negative phase data pin D1− of the first connection terminal 111. In the embodiment, the detection unit 120 may detect whether the connection port 210 is connected to any external device 300 via the first positive phase data pin D1+ and the first negative phase data pin D1− of the first connection terminal 111.

The path control unit 140 is controlled by the processing unit 130. In the embodiment, the path control unit 140 may control whether a first transmission path P1 between the first connection terminal 111 and the second connection terminal 112 is established, whether a second transmission path P2 between the first connection terminal 111 and the processing unit 130 is established, and whether a third transmission path P3 between the second connection terminal 112 and the processing unit 130 is established. In the embodiment, the path control unit 140 normally disconnects the first transmission path P1. Therefore, when the external device 300 is connected to the connection port 210 of the electronic device 200, the external device 300 may not directly be connected to the system circuit 220.

The processing unit 130 controls the path control unit 140 to perform the corresponding process according to the detection result of the detection unit 120. In some embodiment, the processing unit 130 may be implemented by a central processing unit (CPU), a micro-processor, a digital signal processor (DSP), a programmable controller, an application specific integrated circuit (ASIC), a programmable logic device or other similar circuit elements, but the present invention is not limited thereto.

Figure 3:
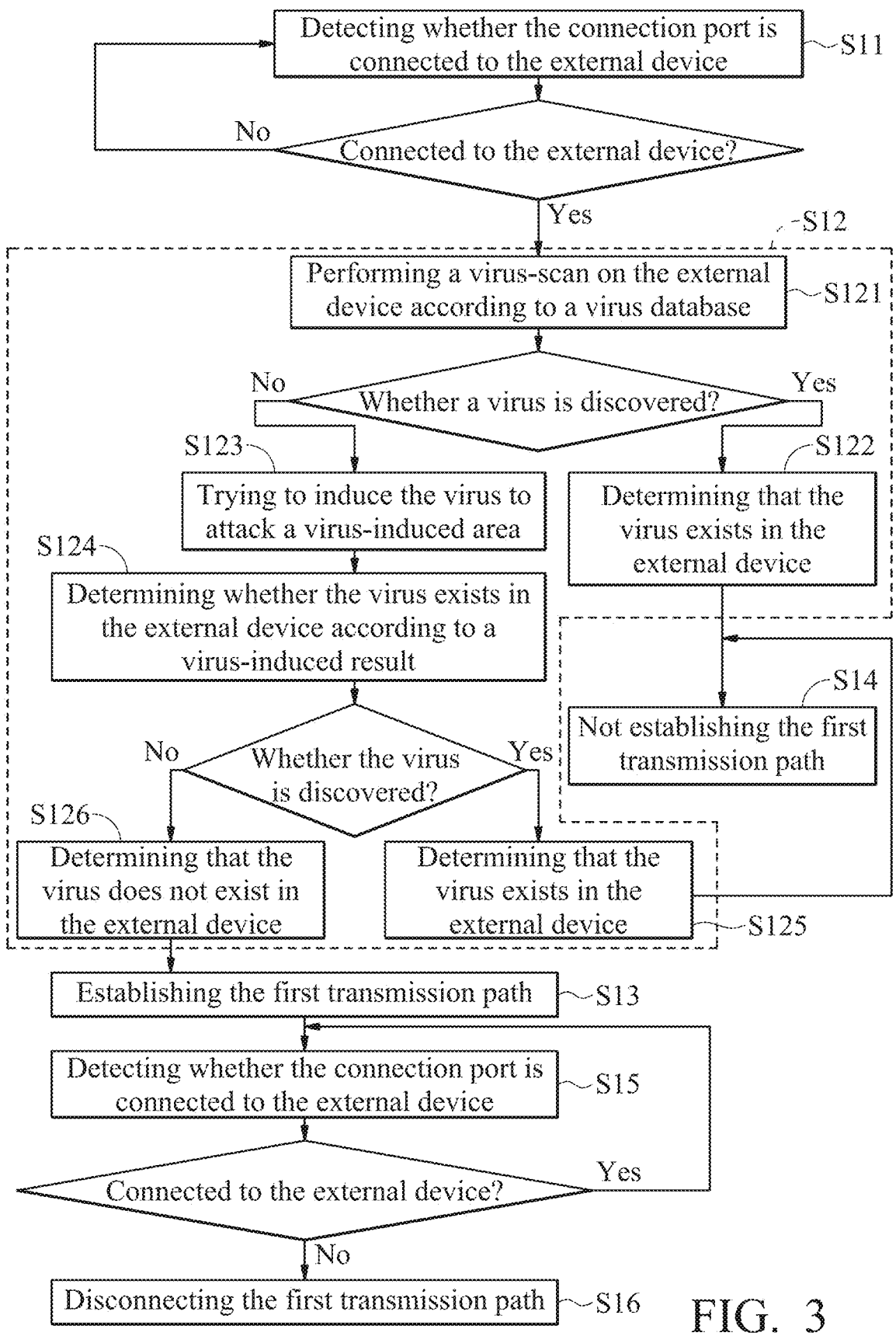
FIG. 3 is a schematic flowchart of a first embodiment of an anti-virus method.

FIG. 3 is a schematic flowchart of a first embodiment of an anti-virus method. Please refer to FIG. 1 to FIG. 3. In the first embodiment of the anti-virus method, the anti-virus chip 100 may use the detection unit 120 to detect whether the connection port 210 is connected to the external device 300 via the first connection terminal 111 (step S11). When the detection unit 120 detects that the connection port 210 is connected to the external device 300, the anti-virus chip 100 may use the processing unit 130 to perform a virus-scan program on the external device 300 to determine whether a virus exists in the external device 300 (step S12). When the processing unit 130 determines that the virus does not exist in the external device 300 in step S12, the anti-virus chip 100 may establish a first transmission path P1 between the first connection terminal 111 and the second connection terminal 112 (i.e., between the connection port 210 and the system circuit 220) (step S13), so that the electronic device 200 and the external device 300 may perform an unidirectional transmission or a bidirectional transmission. For example, the system circuit 220 of the electronic device 200 may write the data to the external device 300 via the first transmission path P1, or read the data from the external device 300 via the first transmission path P1. Otherwise, when the processing unit 130 determines that the virus exists in the external device 300 in step S12, the anti-virus chip 100 may not establish the first transmission path P1, so as to prevent the virus from entering the electronic device 200 from the external device 300 (step S14). Therefore, in the embodiment, after determining that the virus does not exist in the external device 300, the processing unit 130 may cause the path control unit 140 to connect the external device 300 to the system circuit 220, thereby preventing the virus in the external device 300 from infecting (spreading) to the system circuit 220.

In an embodiment of step S11, the detection unit 120 may determine whether the external device 300 is connected to the connection port 210 according to whether a level on the first positive phase data pin D1+ or the first negative phase data pin D1− of the first connection terminal 111 is changed to a predetermined level. For example, when detecting that the level on the first positive phase data pin D1+ or the first negative phase data pin D1− is pulled up to a high level, the detection unit 120 may determine that the connection port 210 is connected to the external device 300, and output an link signal A1 to the processing unit 130. Otherwise, if it is detected that the level on the first positive phase data pin D1+ or the first negative phase data pin D1− are continuously maintained at a low level, the detection unit 120 may determine that the connection port 210 is not connected to the external device 300, and does not output the link signal A1 to the processing unit 130. Therefore, in some embodiments, the processing unit 130 may know whether the external device 300 is connected to the connection port 210 according to whether the link signal A1 is received. In some embodiments, whether the link signal A1 is received may be determined according to the level of the link signal A1. For example, when the processing unit 130 determines that the level of the link signal A1 is at a high level, for example, logic "1", it indicates that the link signal A1 is received. Otherwise, when the processing unit 130 determines that the level of the link signal A1 is at a low level, for example, logic "0", it indicates that the link signal A1 is not received.

After the link signal A1 is received, the processing unit 130 may continue to perform step S12. Otherwise, the processing unit 130 returns to perform step S11, so as to continuously use the detection unit 120 to perform detection.

In some embodiment, the second transmission path P2 located between the first connection terminal 111 and the processing unit 130 is normally disconnected. Therefore, in an embodiment of step S12, the processing unit 130 may first cause the path control unit 140 to establish the second transmission path P2, so as to perform the virus-scan program on the external device 300 via the second transmission path P2, but the present invention is not limited thereto. In other embodiments, the path control unit 140 may also normally establish the second transmission path P2 and disconnect the first transmission path P1 and the third transmission path P3, so that the processing unit 130 may perform the virus-scan program on the external device 300 directly via the second transmission path P2 in the embodiment of step S12.

In some embodiments, the processing unit 130 may include a transmission circuit 131 and a processing circuit 132. The transmission circuit 131 is coupled to the path control unit 140. The processing circuit 132 is coupled to the transmission circuit 131, the path control unit 140 and the detection circuit 120. In the embodiment, after the second transmission path P2 is established, the processing circuit 132 may use the transmission circuit 131 to communicate with the external device 300. In some embodiments, the transmission circuit 131 may be a transmission circuit that conforms to the communication standard of the connection port 210. For example, when the connection port 210 is the universal series bus transmission interface, the transmission circuit 131 may be a master transmission device (USB Host), a slave transmission device (USB Slave) or a master/slave transmission device (USB Host/Slave) that uses the communication standard of the universal series bus.

In some embodiments, the processing circuit 132 may execute step S12 to perform the virus-scan program on the external device 300 when the detection unit 120 detects that the connection port 210 is connected to the external device and the system circuit 220 intends to read the external data of the external device 300, but the present invention is not limited thereto.

In an embodiment of step S12, in the virus-scan program, the processing circuit 132 may perform a virus-scan on the external device 300 through the transmission circuit 131 according to a plurality of virus codes V1-Vn in a virus database L1 (step S121).

In some embodiments, the virus database L1 may be stored in a flash memory 160. In some embodiments, the flash memory 160 may be built in the anti-virus chip 100, and the processing circuit 132 may read the virus database L1 in the flash memory 160 through a flash memory controller 170. In other embodiments, as shown in FIG. 2, the flash memory 160 may also be connected to an external pin 113 of the anti-virus chip 100, and the processing circuit 132 may read the virus database L1 in the flash memory 160 via the external pin 113 through the flash memory controller 170, but the present invention is not limited thereto. In yet other embodiments, the flash memory 160 is further connected to the system circuit 220, and the processing circuit 132 may load the virus database L1 through the system circuit 220. In some embodiments, the external pin 113 may be a serial peripheral interface (SPI).

When the processing circuit 132 discovers that a certain virus exists in the external device 300 according to the virus codes V1-Vn in step S121, the processing circuit 132 may determines that the virus exists in the external device 300 (step S122), and cause the path control unit 140 not to establish the first transmission path (step S14), so as to prevent the virus in the external device 300 from attacking the system circuit 220. In the embodiment, how to search for the virus in the external device 300 according to the virus codes V1-Vn is already well known to those skilled in the art, and the description thereof is not repeated herein.

In an embodiment of step S14, the processing circuit 132 not only causes the path control unit 140 not to establish the first transmission path P1, but also the processing circuit 132 may further perform a security protection program. In an embodiment of the security protection program, the processing circuit 132 may cause the external device 300 to exclude the virus-infected files through the transmission circuit 131, for example, isolating the virus-infected files, formatting the external device 300, etc. In addition, the processing circuit 132 may also generate a warning to notify the user that the external device contains the virus. For example, the processing circuit 132 may upload an interrupt and a data to the system circuit 220 through an enhanced serial peripheral interface (eSPI), and the system circuit 220 may notify the user by displaying a warning message, a warning sound and/or a warning light. Alternatively, the processing circuit 132 may also drive a light emitting element, such as a power light on a computer case, to generate a red flash directly through a general-purpose input/output pin (GPIO pin).

Furthermore, the processing circuit 132 may further cause the path control unit 140 to disconnect the second transmission path P2, so as to disconnect the anti-virus chip 100 from the external device 300.

In some embodiments, the program code of the security protection program may be stored in the flash memory 160, and the processing circuit 132 may perform the security protection program by reading the program code.

In some embodiments, in order to further improve the anti-virus capability of the anti-virus chip 100, when the processing circuit 132 does not discover that virus exists in the external device 300 according to the virus codes V1-Vn in step S121, in the virus-scan program, the processing circuit 132 further try to induce the virus to attack a planned virus-induced area 150A thereof (step S123) and then the processing circuit 132 determines whether the virus exists in the external device 300 according to a virus-induced result of step S123 (step S124).

In some embodiments, the anti-virus chip 100 may further include the random access memory 150, and the random access memory 150 is coupled to the processing circuit 132. The processing circuit 132 may plan a virus-induced area 150A in the random access memory 150. In the embodiment, the virus-induced area 150A may include a plurality of simulation-file system files, so as to simulate a computer system disk to test or induce the virus to attack the virus-induced area 150A. In some embodiments, the simulation-file system file may include a boot sector used to indicate boot information and required files, a root directory used to indicate a file name, a location or attribute, a file allocation table, a file area, etc. In some embodiments, the random access memory 150 may be an internal memory of the processing circuit 132.

In an embodiment of step S124, when the virus-induced result in step S123 indicates that the virus-induced area 150A is attacked by the virus, the processing circuit 132 may determine that the virus exists in the external device 300 (step S125), and cause the path control unit 140 not to establish the first transmission path P1 (step S14). In an embodiment of step S14, the processing circuit 132 causes the path control unit 140 not to establish the first transmission path P1, and the processing circuit 132 may further perform the security protection program. In an embodiment of the security protection program, the processing circuit 132 disconnects the anti-virus chip 100 from the external device 300 and/or generates the warning to notify the user, the processing circuit 132 may also use a reset mechanism to reset the random access memory 150, reload the firmware from the flash memory 160, etc., so as to return the anti-virus chip 100 to an initial security state. In some embodiments, the reset mechanism may include a power reset, a watchdog timer reset or another suitable reset method.

When the virus-induced result indicates that the virus-induced area 150A is not attacked by the virus, the processing circuit 132 may determine that the virus does not exist in the external device 300 (step S126), and cause the path control unit 140 to establish the first transmission path P1 (step S13), so as to connect the external device 300 to the system circuit 220. In some embodiments, the path control unit 140 may disconnect the second transmission path P2 between the first connection terminal 111 and the processing unit 130 when establishing the first transmission path P1.

In some embodiments, after the first transmission path P1 is established, the anti-virus chip 100 may continuously use the detection unit 120 to detect whether the connection port 210 is still connected to the external device 300 via the first connection terminal 111 (step S15). In addition, when the detection unit 120 does not detect that the connection port 210 is connected to the external device 300, the processing circuit 132 may further cause the path control unit 140 to disconnect the first transmission path P1 (step S16), so as to avoid that a person uses another external device with th virus to replace the external device that has passed the detection of the anti-virus chip 100.

Figure 4A:
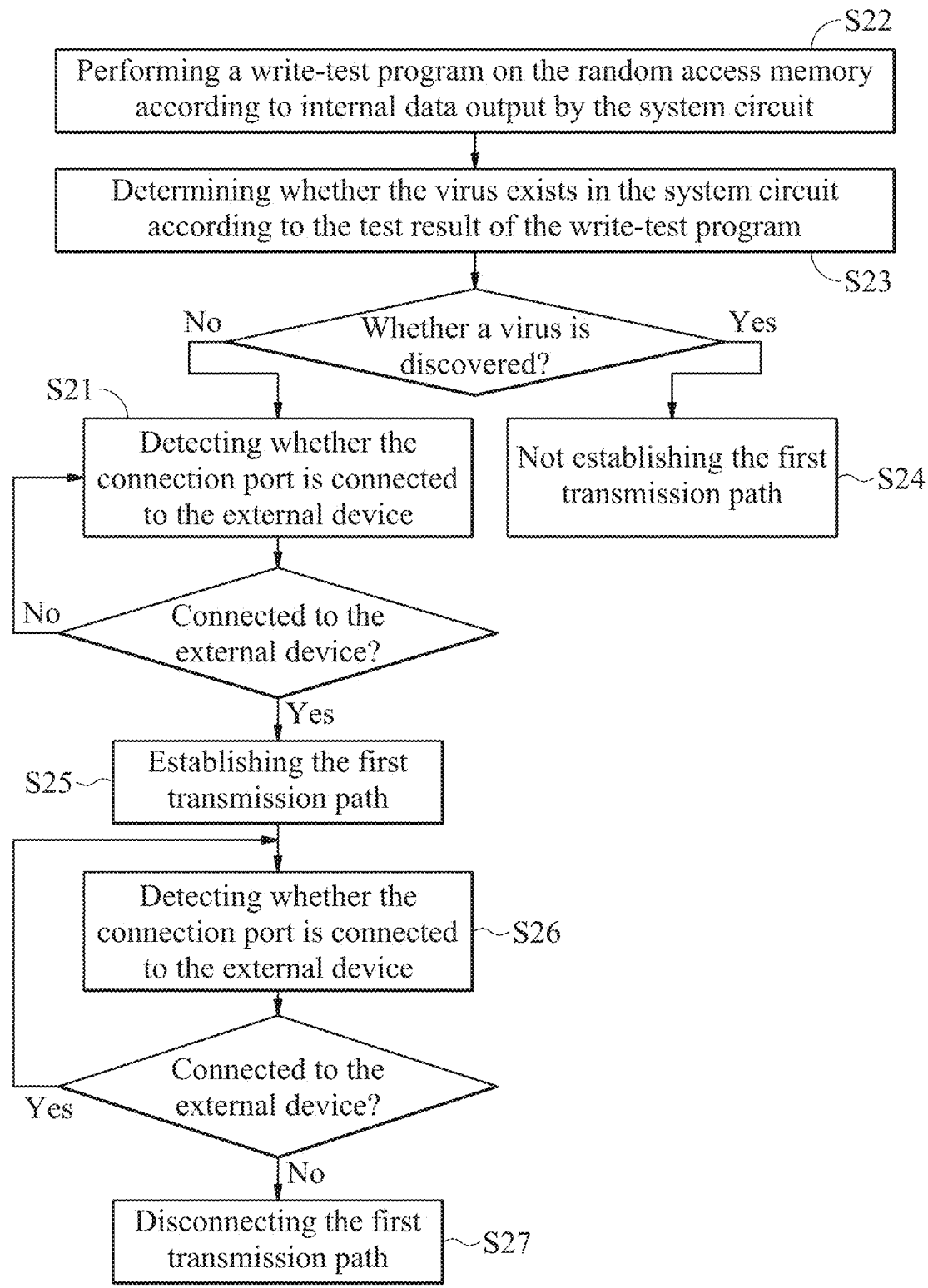
FIG. 4A is a schematic flowchart of a second embodiment of an anti-virus method.

FIG. 4A is a schematic flowchart of a second embodiment of an anti-virus method. Please refer to FIG. 1, FIG. 2 and FIG. 4A. In the second embodiment of the anti-virus method, the anti-virus chip 100 may use the processing circuit 132 of the processing unit 130 to perform a write-test program on the random access memory 150 according to internal data output by the system circuit 220 (step S22), and the processing circuit 132 may determine whether the virus exists in the system circuit 220 according to the test result of the write-test program (step S23). When the processing unit 130 determines that the virus exists in the system circuit 220 in step S23, the anti-virus chip 100 may not cause the path control unit 140 to establish the first transmission path P1 (step S24), so as to prevent the virus from entering the external device 300 from the electronic device 200 when the electronic device 200 is connected to the external device 300. Otherwise, when the processing circuit 132 determines that the virus does not exist in the system circuit 220 in step S23, the anti-virus chip 100 may use the detection unit 120 to detect whether the connection port 210 is connected to the external device 300 via the first connection terminal 111 (step S21). When the detection unit 120 detects that the connection port 210 is connected to the external device 300, the anti-virus chip 100 may cause the path control unit 140 to establish the first transmission path P1 between the first connection terminal 111 and the second connection terminal 112 (i.e., between the connection port 210 and the system circuit 220) (step S25), so that the electronic device 200 and the external device 300 may perform the unidirectional transmission or the bidirectional transmission. Therefore, in the embodiment, after determining that the virus does not exist in the electronic device 200, the processing circuit 132 may cause the path control unit 140 to connect the external device 300 to the system circuit 220, thereby preventing the virus in the electronic device 200 from infecting (spreading) to the external device 300.

In the embodiment, step S21 is substantially the same as step S11, and the description thereof is not limited herein. In the embodiment, the processing circuit 132 may continue to perform step S25 after the link signal A1 of detection unit 120 is received. Otherwise, the processing circuit 132 returns to perform step S21, so as to continuously use the detection unit 120 to perform detection.

In some embodiments, the third transmission path P3 located between the second connection terminal 112 and the processing circuit 132 is normally disconnected. Therefore, in an embodiment of step S22, the processing circuit 132 may first cause the path control unit 140 to establish the third transmission path P3, the processing circuit 132 then use the transmission circuit 131 to receive the internal data output by the system circuit 220, and the processing circuit 132 performs the write-test program on the random access memory 150 according to the received internal data, but the present invention is not limited thereto. In other embodiments, the path control unit 140 may also normally establish the third transmission path P3 and disconnect the first transmission path P1 and the second transmission path P2, so that the processing circuit 132 may directly use the transmission circuit 131 to receive the internal data output by the system circuit 220, and the processing circuit 132 performs the write-test program on the random access memory 150 according to the received internal data.

In some embodiments, the internal data output by the system circuit 220 is the data that the user intends to copy from the electronic device 200 to the external device 300. In the write-test program of step S22, the anti-virus chip 100 may be simulated as a storage device through a virtual disk simulation technology, so that the writing operation that the system circuit 220 originally intended to perform on the external device 300 may be first performed on the random access memory 150 of the anti-virus chip 100. That is, the processing unit 130 may simulate the random access memory 150 as a storage device, so that the processing circuit 132 of the processing unit 130 performs the write-test program on the random access memory 150 according to the internal data output by the system circuit 220, so as to drive the system circuit 220 to perform a virus test on the above storage device, thereby determining whether the virus exists in the system circuit 220.

In an embodiment of step S23, the processing circuit 132 may determine whether the virus exists in the system circuit 220 according to whether the random access memory 150 occurs a virus inflection phenomenon after the write-test program in step S22.

In an embodiment of step S24, the processing circuit 132 not only causes the path control unit 140 not to establish the first transmission path P1, but also the processing circuit 132 may further perform the corresponding security protection program. In an embodiment of the security protection program, the processing circuit 132 may generate a warning to notify the user. Furthermore, the processing circuit 132 may also use a reset mechanism to reset the random access memory 150, reload the firmware from the flash memory 160, etc., so as to return the anti-virus chip 100 to an initial security state.

In an embodiment of step S25, the path control unit 140 may disconnect the third transmission path P3 between the second connection terminal 112 and the processing unit 130 when establishing the first transmission path P1.

In some embodiments, after the first transmission path P1 is established, the anti-virus chip 100 may continuously use the detection unit 120 to detect whether the connection port 210 is still connected to the external device 300 via the first connection terminal 111 (step S26). In addition, when the detection unit 120 does not detect that the connection port 210 is connected to the external device 300, the processing circuit 132 further cause the path control unit 140 to disconnect the first transmission path P1(step S27).

Figure 4B:
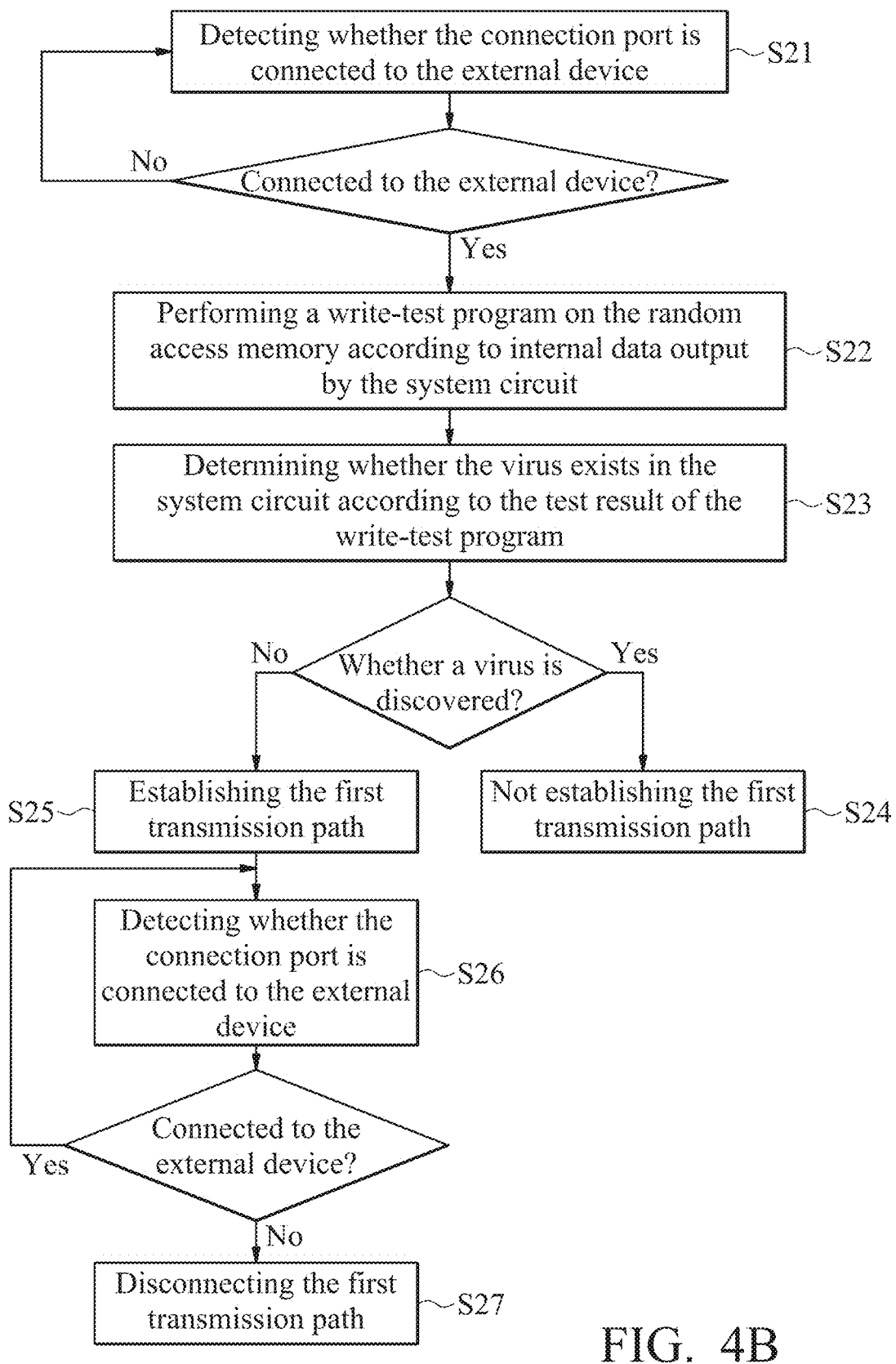
FIG. 4B is a schematic flowchart of a third embodiment of an anti-virus method.

FIG. 4B is a schematic flowchart of a third embodiment of an anti-virus method. The third embodiment of the anti-virus method of FIG. 4B is substantially similar to the second embodiment of the anti-virus method of FIG. 4A. The difference between FIG. 4B and FIG. 4A is the performing order of step S21. That is, step S21 of FIG. 4A is performed after determining that the virus does not exist in the system circuit 220 in step S23. Step S21 of FIG. 4B is performed before step S22. Steps S21 in FIG. 4A and FIG. 4B are performed before step S25. In addition, in the third embodiment of the anti-virus method of FIG. 4B, the processing circuit 132 may continue to perform step S22 after the link signal A1 of the detection unit 120 is received. Otherwise, the processing circuit 132 returns to perform step S21, so as to continuously use the detection unit 120 to perform detection. In addition, the third embodiment of FIG. 4B may refer to the description of the second embodiment of FIG. 4A, and the same effect may be also achieved.

FIG. 5 is a schematic flowchart of a fourth embodiment of an anti-virus method. Please refer to FIG. 1, FIG. 2 and FIG. 5. In the fourth embodiment of the anti-virus method, the anti-virus chip 100 may use the detection unit 120 to detect whether the connection port 210 is connected to the external device 300 via the first connection terminal 111 (step S31). When the detection unit 120 detects that the connection port 210 is connected to the external device 300, the anti-virus chip 100 may use the processing circuit 132 to perform a virus-scan program on the external device 300 to determine whether a virus exists in the external device 300 (step S32). In addition, the anti-virus chip 100 may use the processing circuit 132 to perform a write-test program on the random access memory 150 according to internal data output by the system circuit 220 (step S33), and the processing circuit 132 may determine whether the virus exists in the system circuit 220 according to the test result of the write-test program (step S34).

In some embodiments, the anti-virus chip 100 may use the processing circuit 132 to first cause the path control unit 140 to establish the second transmission path P2, so as to perform step S32 to determine whether the virus exists in the external device 300. Then, the anti-virus chip 100 may use the processing circuit 132 to cause the path control unit 140 to disconnect the second transmission path P2 and establish the third transmission path P3, so as to perform step S33 and step S34 to determine whether the virus exists in the system circuit 220. However, the present invention is not limited thereto. In other embodiments, the anti-virus chip 100 may also first cause the path control unit 140 to establish the third transmission path P3, so as to perform step S33 and step S34 to determine whether the virus exists in the system circuit 220. Afterward, the anti-virus chip 100 may use the processing circuit 132 to cause the path control unit 140 to disconnect the third transmission path P3 and establish the second transmission path P2, so as to perform step S32 to determine whether the virus exists in the external device 300.

When the processing circuit 132 determines that the virus exists in the external device 300 in step S32 or determines that the virus exists in the system circuit 220 in step S34, the anti-virus chip 100 does not establish the first transmission path P1 (step S35). Otherwise, when the processing circuit 132 determines that the virus does not exist in the external device 300 in step S32 and determines that the virus does not exist in the system circuit 220 in step S34, the anti-virus chip 100 may establish the first transmission path P1 (step S36), so that the electronic device 200 and the external device 300 may perform the unidirectional transmission or the bidirectional transmission. Therefore, in the embodiment, after determining that the virus does not exist in the external device 300 and determining that the virus does not exist in the electronic device 200, the processing unit 130 may cause the path control unit 140 to connect the external device 300 to the system circuit 220, thereby preventing any party from being attacked by the virus.

In some embodiments, after the first transmission path P1 is established, the anti-virus chip 100 may continuously use the detection unit 120 to detect whether the connection port 210 is still connected to the external device 300 via the first connection terminal 111 (step S37). In addition, when the detection unit 120 does not detect that the connection port 210 is connected to the external device 300, the processing circuit 132 may further cause the path control unit 140 to disconnect the first transmission path P1 (step S38).

In the embodiment, step S31 is substantially the same as step S11 and step S21. Step S32 is substantially the same as step S12. Step S33 is substantially the same as step S22. Step S34 is substantially the same as step S23. Step S35 is substantially the same as step S14 and step S24. In addition, step S36 is substantially the same as step S13 and step S25. Therefore, the detailed embodiment is not repeated herein.

It is worth noting that since the firmware (stored in the flash memory 160) of the anti-virus chip 100 and the performing memory (i.e., the random access memory 150) are hardware separated, the flash memory 160 may not be infected by the virus, and therefore the anti-virus chip 100 is not worried about being attacked by the virus. In particular, since there is no so-called boot sector in the anti-virus chip 100, it does not need to worry about being attacked by the boot virus. Furthermore, even if the data of the random access memory 150 is damaged by virus tempering, the anti-virus chip 100 may be restored to the initial security state as long as the power is re-turned on.

In summary, according to the anti-virus chip and the anti-virus method disclosed by the embodiment of the present invention, the anti-virus chip coupled between the connection port and the system circuit of the electronic device is used to block the external device from directly connecting to the system circuit through the connection port, and only after determining that the virus does not exist in the external device and/or determining that the virus does not exist in the system circuit, the external device is connected to the electronic device, so that the electronic device and/or the external device may benefit from virus protection.

While the present invention has been described by way of example and in terms of the preferred embodiments, it should be understood that the present invention is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An anti-virus chip, comprising:
    a first connection terminal, coupled to a connection port of an electronic device;
    a second connection terminal, coupled to a system circuit of the electronic device;
    a detection unit, configured to detect whether the connection port is connected to an external device, via the first connection terminal;
    a processing unit, wherein when the detection unit detects that the connection port is connected to the external device, the processing unit performs a virus-scan program on the external device to determine whether a virus exists in the external device, when determining that the virus does not exist in the external device, the processing unit establishes a first transmission path between the first connection terminal and the second connection terminal, and when determining that the virus exists in the external device, the processing unit does not establish the first transmission path; and
    a first random access memory, comprising a virus-induced area, and the virus-induced area comprising a plurality of simulation-file system files, wherein when the processing unit does not discover that the virus exists in the external device according to a plurality of virus codes in a virus database, the processing unit induces the virus to attack the virus-induced area in the virus-scan program, the processing unit further determines whether the virus exists in the external device according to a virus-induced result of the virus-induced area, when the virus-induced result indicates that the virus-induced area is not attacked by the virus, the processing unit determines that the virus does not exist in the external device, and when the virus-induced result indicates that the virus-induced area is attacked by the virus, the processing unit determines that the virus exists in the external device.

2. The anti-virus chip as claimed in claim 1, further comprising:
    a path control unit, configured to establish or disconnect the first transmission path, wherein the processing unit normally causes the path control unit to disconnect the first transmission path, the processing unit causes the path control unit to establish the first transmission path when determining that the virus does not exist in the external device, and after the first transmission path is established, the processing unit further causes the path control unit to disconnect the first transmission path when the detection unit detects that the connection port is not connected to the external device.

3. The anti-virus chip as claimed in claim 2, wherein the path control unit is further configured to establish or disconnect a second transmission path between the processing unit and the first connection terminal, wherein when the detection unit detects that the connection port is connected to the external device, the processing unit further causes the path control unit to establish the second transmission path between the processing unit and the first connection terminal, so as to perform the virus-scan program on the external device via the second transmission path.

4. The anti-virus chip as claimed in claim 1, wherein the processing unit comprises:
    a transmission circuit; and
    a processing circuit, wherein when the virus-scan program is performed, the processing circuit performs a virus-scan on the external device through the transmission circuit according to the plurality of virus codes in the virus database, and when the processing circuit discovers that the virus exists in the external device according to the virus codes, the processing circuit determines that the virus exists in the external device.

5. The anti-virus chip as claimed in claim 1, wherein when determining that the virus does not exist in the external device, the processing unit establishes the first transmission path that the first connection terminal and the second connection terminal are directly coupled.

6. The anti-virus chip as claimed in claim 1, further comprising:
    a second random access memory, wherein when the detection unit detects that the connection port is connected to the external device, the processing unit further performs a write-test program on the second random access memory according to internal data output by the system circuit, the processing unit determines whether another virus exists in the system circuit according to a test result of the write-test program, the processing unit establishes the first transmission path when determining that the virus does not exist in the external device and the another virus does not exist in the system circuit, and the processing unit does not establish the first transmission path when determining that the virus exists in the external device or the another virus exists in the system circuit.

7. The anti-virus chip as claimed in claim 6, further comprising:
    a path control unit, wherein the processing unit uses the path control unit to establish or disconnect the first transmission path, the processing unit further uses the path control unit to establish a second transmission path between the processing unit and the first connection terminal, so as to perform the virus-scan program on the external device via the second transmission path, the processing unit further uses the path control unit to establish a third transmission path between the second connection terminal and the processing unit, so as to receive the internal data via the third transmission path wherein the path control unit further disconnects the other two when the path control unit establishes any one of the first transmission path, the second transmission path and the third transmission path.

8. An anti-virus method, suitable for an anti-virus chip, wherein the anti-virus chip is coupled between a connection port of an electronic device and a system circuit of the electronic device, and the anti-virus method comprises:
  detecting whether the connection port is connected to an external device;
  performing a virus-scan program on the external device to determine whether a virus exists in the external device when detecting that the connection port is connected to the external device;
  establishing a first transmission path between the connection port and the system circuit when determining that the virus does not exist in the external device; and
  not establishing the first transmission path when determining that the virus exists in the external device;
  wherein the anti-virus chip comprises a random access memory, the random access memory comprises a virus-induced area, the virus-induced area comprises a plurality of simulation-file system files, and the anti-virus method further comprises:
    inducing the virus to attack the virus-induced area when not discovering that the virus exists in the external device according to a plurality of virus codes in a virus database;
    determining whether the virus exists in the external device according to a virus-induced result of the virus-induced area;
    determining that the virus does not exist in the external device when the virus-induced result indicates that the virus-induced area is not attacked by the virus; and
    determining that the virus exists in the external device when the virus-induced result indicates that the virus-induced area is attacked by the virus.

9. The anti-virus method as claimed in claim 8, wherein after the step of establishing the first transmission path between the connection port and the system circuit, the anti-virus method further comprises:
  detecting whether the connection port is connected to the external device; and
  disconnecting the first transmission path when not detecting that the connection port is connected to the external device.

10. The anti-virus method as claimed in claim 8, wherein the step of performing the virus-scan program on the external device to determine whether the virus exists in the external device comprises:
  performing a virus-scan on the external device according to the virus codes in the virus database; and
  determining that the virus exists in the external device when discovering that the virus exists in the external device according to the virus codes.

11. The anti-virus method as claimed in claim 10, further comprising:
  establishing a second transmission path between a processing unit of the anti-virus chip and the connection port when detecting that the connection port is connected to the external device, wherein the step of performing the virus-scan on the external device according to the plurality of virus codes in the virus database is performed on the external device via the second transmission path.

12. The anti-virus method as claimed in claim 8, wherein the step of establishing the first transmission path between the connection port and the system circuit when determining that the virus does not exist in the external device includes establishing the first transmission path that the connection port and the system circuit are directly coupled when determining that the virus does not exist in the external device.

13. An anti-virus chip, comprising:
  a first connection terminal, coupled to a connection port of an electronic device;
  a second connection terminal, coupled to a system circuit of the electronic device;
  a first random access memory;
  a processing unit, wherein the processing unit performs a write-test program on the first random access memory according to internal data output by the system circuit, the processing unit determines whether a virus exists in the system circuit according to a test result of the write-test program, when determining that the virus does not exist in the system circuit, the processing unit establishes a first transmission path between the first connection terminal and the second connection terminal, and when the virus exists in the system circuit, the processing unit does not establish the first transmission path; and
  a second random access memory, wherein the second random access memory comprises a virus-induced area, and the virus-induced area comprises a plurality of simulation-file system files, wherein when a detection unit detects that the connection port is connected to an external device, the processing unit further performs a virus-scan on the external device according to a plurality of virus codes in a virus database, when the processing unit does not discover that another virus exists in the external device according to the virus codes, the processing unit induces the another virus to attack the virus-induced area in the virus-scan, the processing unit further determines whether the another virus exists in the external device according to a virus-induced result of the virus-induced area, when the virus-induced result indicates that the virus-induced area is not attacked by the another virus, the processing unit determines that the another virus does not exist in the external device and, and when the virus-induced result indicates that the virus-induced area is attacked by the another virus, the processing unit determines that the another virus exists in the external device and does not establish the first transmission path.

14. The anti-virus chip as claimed in claim 13, further comprising:
  the detection unit, configured to detect whether the connection port is connected to the external device via the first connection terminal before the processing unit establishes the first transmission path.

15. The anti-virus chip as claimed in claim 14, wherein when the detection unit detects that the connection port is connected to the external device, the processing unit further establishes a second transmission path between the second connection terminal and the processing unit, so as to receive the internal data via the second transmission path.

16. The anti-virus chip as claimed in claim 13, wherein when determining that the virus does not exist in the system circuit, the processing unit establishes the first transmission path that the first connection terminal and the second connection terminal are directly coupled.

\* \* \* \* \*